United States Patent [19]
He

[11] Patent Number: 5,777,872
[45] Date of Patent: Jul. 7, 1998

[54] METHOD AND SYSTEM FOR CONTROLLING A MULTIPLE INPUT/OUTPUT PROCESS WITH MINIMUM LATENCY

[75] Inventor: Xiaohua George He, Menlo Park, Calif.

[73] Assignee: Honeywell-Measurex Corporation, Cupertino, Calif.

[21] Appl. No.: 713,461

[22] Filed: Sep. 13, 1996

[51] Int. Cl.$^6$ .............................. G06F 19/00; F05B 13/04
[52] U.S. Cl. .................. 364/149; 364/148.08; 364/148.1; 364/157; 364/471.03
[58] Field of Search ........................ 364/148, 149–151, 364/152, 157, 158, 164, 165, 176, 471.01, 471.02, 471.03; 318/561

[56] References Cited

U.S. PATENT DOCUMENTS

| | | | |
|---|---|---|---|
| 3,610,899 | 10/1971 | Dahlin | 364/471.03 |
| 4,346,433 | 8/1982 | Rutledge | 364/162 |
| 4,368,510 | 1/1983 | Anderson | 364/151 |
| 4,407,013 | 9/1983 | Arcara et al. | 364/149 |
| 4,423,594 | 1/1984 | Ellis | 364/149 X |
| 4,578,747 | 3/1986 | Hifeg et al. | 364/151 |
| 4,602,326 | 7/1986 | Kraus | 364/158 |
| 4,646,226 | 2/1987 | Moon | 364/176 |
| 4,707,779 | 11/1987 | Hu | 364/148 |
| 4,805,126 | 2/1989 | Rodems | 364/571.01 |
| 4,814,968 | 3/1989 | Fukumoto | 364/150 |
| 4,893,262 | 1/1990 | Kalata | 364/567 |
| 4,998,051 | 3/1991 | Ito | 364/165 X |
| 5,121,332 | 6/1992 | Balakrishnan et al. | 364/471.03 |
| 5,144,549 | 9/1992 | Youcef-Toumi | 364/148 |
| 5,446,648 | 8/1995 | Abramovitch et al. | 364/148 |
| 5,519,605 | 5/1996 | Cawlfield | 364/165 X |
| 5,539,634 | 7/1996 | He | 364/158 |

OTHER PUBLICATIONS

"A Linear Programming Approach to Constrained Multivariable Process Control" by C. Brosilow et al., Control and Dynamic Systems, vol. 27, system Identification and Adaptive Control, 1988, Academic Press, Inc., pp. 141, 148 and 149.

"A Simple Adaptive Smith–Predictor for Controlling Time–Delay Systems" by A. Terry Bahill, Control Systems Magazine, May 1983, pp. 16–22.

"Theory and Problems of Feedback and Control Systems" by Joseph J. Distefano, III, Ph.D et al, 1967, McGraw-Hill, Inc., Chaapter 2, pp. 13 and 14.

"Multivariable Internal Model Control for a Full–Scale Industrial Distillation Column," by J.M. Wassick and R. Lal Tummala, IEEE Control Systems Magazine, 1989, pp. 91–96.

"Method for Automatic Adaptation of the Time Constant for a First Order Filter", from the Industrial and Engineering Chemistry Research, No. 29, 1991, pp. 275–277.

*Primary Examiner*—Joseph Ruggiero
*Attorney, Agent, or Firm*—Burns, Doane, Swecker & Mathis, LLP

[57] ABSTRACT

A control system regulates a controlled process. A first controller receives at least a first input variable and a second input variable and produces at least a first control variable and a second control variable. A delay unifier associated with the first controller introduces a first delay to one of the first and second control variables, the first delay being determined as a function of a second delay associated with another of the first and second control variables, and outputs first and second control variables with unified delay. A processor models effects of the controlled process. The processor receives the delayed first and second control variables output by the first controller and produces estimated process output variables. A second controller processes a difference between measured process output variables and the estimated process output variables to correct for disturbances. The processed difference is added to the delayed first and second control variables output by the first controller, and the sum is received by the processor and the process being controlled.

16 Claims, 2 Drawing Sheets

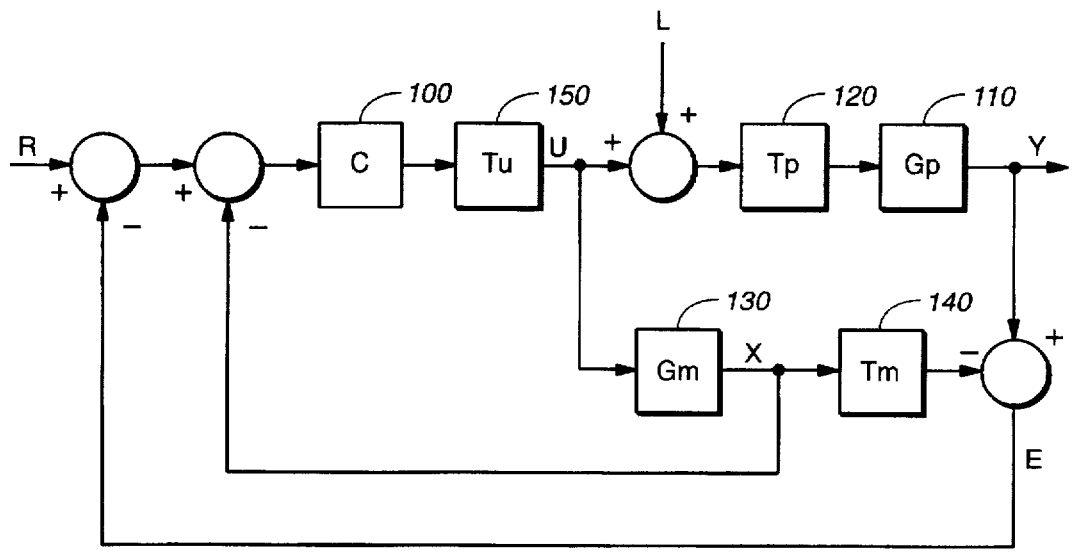
FIG._1
(PRIOR ART)
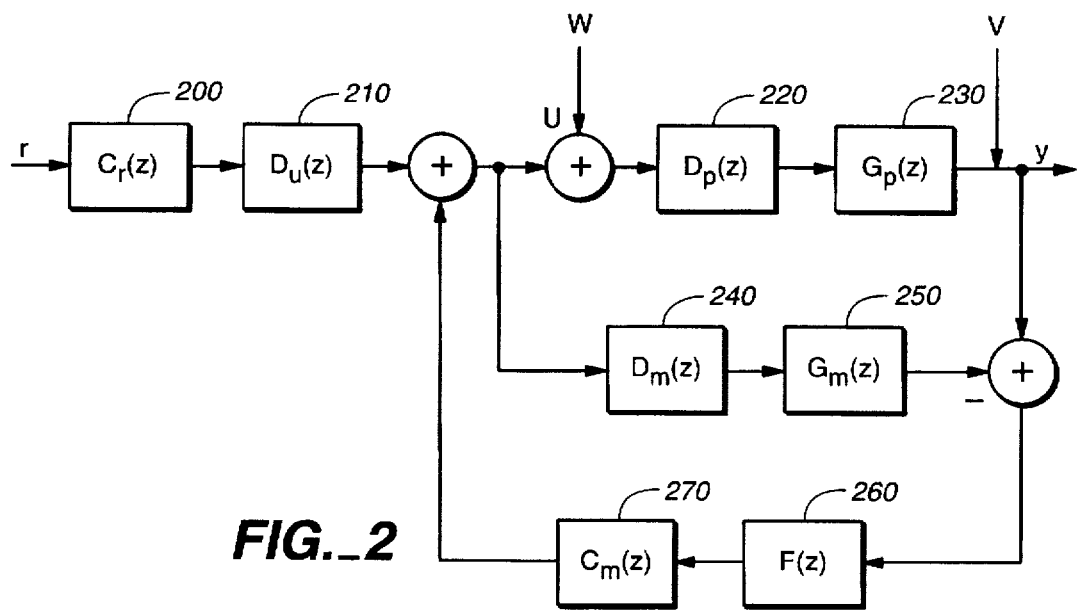
FIG._2

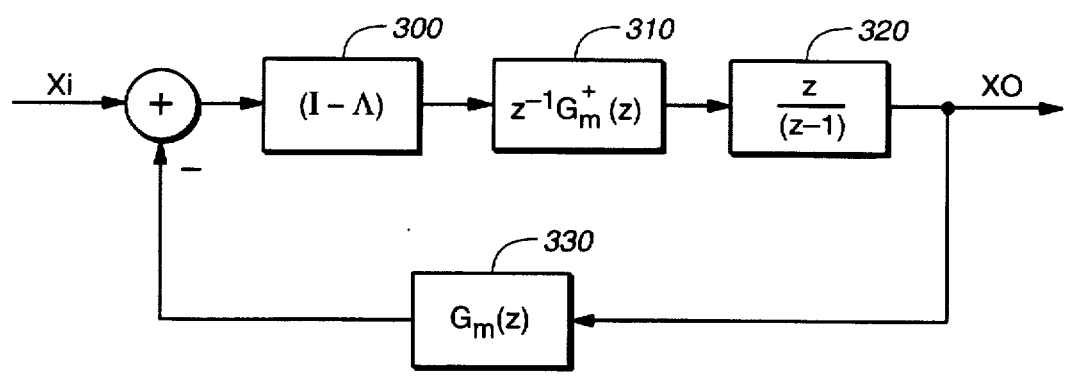
FIG._3

METHOD AND SYSTEM FOR CONTROLLING A MULTIPLE INPUT/OUTPUT PROCESS WITH MINIMUM LATENCY

BACKGROUND OF THE INVENTION

1. Field of the Invention

The present invention relates generally to process control systems. More particularly, the present invention relates to a control system and method for controlling a process that has multiple input variables and multiple output variables.

2. State of the Art

Many continuous industrial processes can be modeled as a stable dynamic system with multiple input variables and multiple output variables. Furthermore, a large class of such dynamic system models can be divided into two elements, a minimum phase dynamic element and a pure time-delay (or non-minimum phase) element.

For example, in a typical sheetmaking process, there are multiple input variables, multiple control variables, and multiple output variables. The input variables represent reference values, or setpoints, of the sheetmaking system, the control variables correspond to the reference values as processed by a controller, and the output variables correspond to the results of processing by the sheetmaking system. The control variables may represent, for example, the stock flow, the steam pressure, and the filler flow. The stock flow refers to the amount of fibers per sheet, the steam pressure refers to the pressure of steam applied to the sheet during drying, and the filler flow refers to the amount of additives added to the sheet during processing. The input and output variables may represent, for example, basis weight, moisture content, and ash content. As expected, changes in particular ones of the control variables produce corresponding changes in particular ones of the output variables.

For example, a change in the stock flow causes a change in the basis weight; a change in the steam pressure causes a change in the moisture content; and a change in the filler flow causes a change in the ash content. Additionally, changes in the control variables may cause changes in more than one of the output variables. For example, a change in the stock flow may also change the moisture since the heavier the sheet is, the more difficult it is to dry. A change in steam pressure may cause a change in the basis weight since the drier a sheet is, the lighter it will be. Also, a change in the filler flow may cause a change in the moisture content and the basis weight. Ideally, a control system would be able to independently change one of the output variables by changing one control variable, without affecting the other control variables or output variables.

One control system solution for producing independent control of the individual output variables deals with the different time-delays for processing different control variables. For example, the stock flow control variable may experience a delay of one minute, while the steam pressure control variable experiences a delay of twenty seconds, and the filler flow control variable experiences a delay of one and a half minutes. To deal with this disparity in delays between the control variables, an artificial delay is introduced in the controller. The control variables that are processed quickly are held until the other control variables are processed so that the variables are in time-sync with each other.

For example, an artificial delay is introduced for the steam flow pressure control variable to hold it until the stock flow control variable and the filler flow control variable are processed. In this way, the steam control variable can be manipulated to cause a change in the moisture output variable, without affecting the basis weight or the ash content output variables. This type of control is referred to as "setpoint tracking" because the controller "tracks" the reference input variable or "setpoint", adjusting the delay for the control variable to move the output variable in line with the desired "setpoint".

One control system solution for this class of industrial application is to use the technique of Internal Model Control (IMC) that can be illustrated by a functional block diagram shown in FIG. 1. Referring to FIG. 1, the input reference or setpoint variables are represented by the vector R, the control variables are represented by the vector U, the output variables are represented by the vector Y, and the external process disturbances are represented by L. The system includes a control system and the process or plant being controlled. The process is conceptually divided into a minimum phase stable dynamic element Gp 110 and a time-delay (non-minimum phase dynamic) element Tp 120. The control system includes a controller C 100, a predictive process dynamic model Gm 130, a process time-delay model Tm 140, and a process time-delay unifier Tu 150. The elements of process models Gm and Tm are constructed such that their input-output characteristics match with the corresponding conceptual elements of the real process Gp and Tp as well as Tu.

The FIG. 1 system includes feedback of model prediction errors E, which is the difference between the process output variables Y through the delay unifier Tu 150 and the internal model output variables from Tm 140. It also includes inner loop feedback of predictive model output variables X from Gm 130. The controller C 100 makes the output variables track the input reference variables by minimizing model prediction errors E and the reference errors between reference input variables R and predictive model output variables X. The controller C 100 is designed so that changes to a particular input reference variable in the vector R produce the same changes in the corresponding output variable in the vector Y, with time-delays Tm and a transient time.

Such a design is referred to as decoupled setpoint tracking. In order to achieve such decoupled setpoint tracking, the time-delays in the vector Tm must be identical. Therefore, time-delays in the vector Tu (=Tm−Tp) need to be greater than or equal to zero. Thus, this type of control system architecture requires artificially added time-delays (Tu) for decoupled setpoint tracking.

A problem with this conventional type of control system is that the additional time-delays (Tu) deteriorate the disturbance rejection capability of the control system. With the additional time-delays, the process output variables Y are more severely affected by the disturbances L.

In an ideal system, there are no disturbances, i.e., nothing outside of the control variables in the system affects the output variables. However, in practice, both periodic and random disturbances, such as speed changes and material (stock) property changes, affect the output variables.

Typically, a feedback control system such as that shown in FIG. 1 handles disturbances using the same controller used for setpoint tracking. That is, referring to FIG. 1, the output variables are measured, an error is produced if the measured output variables move away from the target input variable, the error is fed back to the controller C, and the controller varies the control variables to attempt to correct for the error.

Using the same controller to provide both decoupled setpoint tracking and disturbance rejection causes some problems. For example, if the steam pressure control variable is delayed to wait for the stock flow control variable to be processed, the moisture output variable will hold the same error for a longer time period. By the time the steam pressure control variable is cleared, the disturbance may have changed (increased or decreased), and the actual disturbance error will be different than the error held for the moisture control variable. Thus, using the same controller for both decoupled setpoint tracking and disturbance rejection produces inaccurate correction of disturbance errors.

There is thus a need for a different control system architecture that can maintain the decoupled setpoint tracking and at the same time not lose the capacity of disturbance rejection.

SUMMARY OF THE INVENTION

It is an object of the present invention to provide a new control system architecture that maximizes disturbance rejection by minimizing feedback latency while providing decoupled setpoint tracking.

According to the present invention, this and other objects are met by a control system and method for regulating a controlled process. In accordance with exemplary embodiments, the control system comprises a first controller for receiving at least a first input reference variable and a second input reference variable and producing at least a first control variable and a second control variable, wherein said first controller introduces a first delay to one of the first and second control variables, the first delay being determined as a function of a second delay associated with another of the first and second control variables. The control system also comprises a processor for modelling effects of the controlled process, the processor receiving the delayed first and second control variables output by the first controller and producing estimated process output variables. The control system further comprises a second controller for receiving a difference between measured process output variables and the estimated process output variables to correct for disturbances. The processed difference is added to the delayed first and second control variables output by the first controller, and the sum is received by the processor and the process being controlled.

BRIEF DESCRIPTION OF THE DRAWINGS

The present invention can be further understood with reference to the following description and the appended drawings, wherein like elements are provided with the same reference numerals. In the drawings:

FIG. 1 depicts a functional block diagram of a conventional IMC control system for a sheetmaking process;

FIG. 2 depicts a functional block diagram of a control system for a controlled process according to one embodiment of the present invention; and FIG. 3 depicts a detailed functional block diagram of the controller blocks $C_r(z)$ and $C_m(z)$ shown in FIG. 2.

DETAILED DESCRIPTION OF THE PREFERRED EMBODIMENTS

An exemplary embodiment of the invention will be described in terms of a control system for regulating a sheetmaking process. It will be understood, however, that the present invention is not limited to regulating a sheetmaking process but can be applied to other controlled processes.

FIG. 2 depicts a functional block diagram of a control system for a controlled process according to one embodiment of the present invention. Referring to FIG. 2, the reference input variables are represented by the vector r, the control variables are represented by the vector u, and the output variables are represented by the vector y. The vectors w and v represent disturbance variables which occur in the physical process.

The system includes two controllers, $C_r(z)$ 200 and $C_m(z)$ 270. $C_r(z)$ 200 represents a control module for setpoint tracking based on the reference input variables r, and $C_m(z)$ 270 represents a control module for disturbance rejection. $D_u(z)$ 210 represents a time-delay unifier unit which, although depicted as a separate block in FIG. 2, can be included in the controller $C_r(Z)$. $D_u(z)$ introduces artificial delay(s) to compensate for different delays in the physical process where the control variables propagate and influence output variables.

As shown in FIG. 2, no feedback is used for the setpoint tracking controller $C_r(z)$ 200. This is because if the control model is correct, feedback for setpoint tracking is not required.

$G_p(z)$ 230 represents the dynamics of the physical sheetmaking process. $G_p(z)$ produces actual (measured) process output variables. $D_p(z)$ 220 represents the time-delay in the physical sheetmaking process. The disturbances w and v are introduced at, for example, the input of $D_p(z)$ 220 and the output of $G_p(z)$ 230. $G_m(z)$ 250 is an internal process model representing the dynamics of the sheetmaking process. $G_m(z)$ 250 produces estimated, e.g., predictive process output variables. $D_m(z)$ 240 represents a model of time-delay in the sheetmaking process. The estimated process variables output by the model $G_m(z)$ 250 are subtracted from the real process variables output by the dynamic model $G_p(z)$ 230, and the difference is considered an estimate of the disturbance effects. This estimate is fed to the controller $C_m(z)$ 270 which minimizes the disturbance effects.

Outputs of the disturbance rejecting controller $C_m(z)$ 270 are added to outputs of the setpoint tracking controller $C_r(z)$ 200 to produce the control variables u. Thus, although disturbance rejection and setpoint tracking are performed separately by separate controllers, the control variables u input into the process $G_p(z)$ 230 and the internal process model $G_m(z)$ 250 have been adjusted both for setpoint tracking and disturbance rejection.

The difference between the measured process variables and the estimated process variables can be fed to the controller $C_m(z)$ 270 via a filter F(z) 260. The filter F(z) 260 addresses the mismatch of the process model $G_m(z)$ 270 with the real process dynamics $G_p(z)$. Typically, the control model is matched to what occurs at a particular frequency or in a particular frequency range. For example, low frequency signals are generally easier to model, i.e., the model and the process are usually better matched for low frequency input and output signals. Thus, the filter F(z) 260 may, for example, be a low pass filter which filters out high frequency signals, passing only low frequency signals to the control module $C_m(z)$ 270.

Each of the components illustrated in FIG. 2 can be implemented with traditional components which one skilled in the art of control theory would appreciate. The components can be implemented with software, except for $G_p$ and $D_p$, which represent an actual process.

According to one embodiment, the components can be implemented using the discrete equations below.

The sheetmaking process can be given as:

$$G_p = (Z - A_p)^{-1} B_p \quad (1)$$

where $A_p$ and $B_p$ are constants which can be in the form of nxn matrices. The delay in the sheetmaking process can be given as:

$$D_p = \text{diag}(z^{-dpi}) \quad (2)$$

where dpi represents the time-delay of the ith input with the unit of sample time, and $\text{diag}(z^{-dpi})$ represents a diagonal matrix with $Z^{-dpi}$ as its ith diagonal element and zero as the remaining matrix elements (i.e. the off-diagonal elements). The process described by equations (1) and (2) can be represented in the time domain as:

$$\begin{bmatrix} y_1(t) \\ \cdot \\ \cdot \\ \cdot \\ y_n(t) \end{bmatrix} = A_p \begin{bmatrix} y_1(t-1) \\ \cdot \\ \cdot \\ \cdot \\ y_n(t-1) \end{bmatrix} + B_p \begin{bmatrix} u_1(t-d_{p1}) \\ \cdot \\ \cdot \\ \cdot \\ u_n(t-d_{pn}) \end{bmatrix}$$

The internal model for the sheetmaking process can be given as:

$$G_m = (Z - A_m)^{-1} B_m \quad (3)$$

where $A_m$ and $B_m$ are predetermined values which can be in the form of nxn matrices. The values $A_m$ and $B_m$ are determined such that they are as close to $A_p$ and $B_p$ as possible, with values equal to $A_p$ and $B_p$ being ideal.

The time-delay model for the sheetmaking process can be given as:

$$D_m = \text{diag}(-z^{31\ dmi}) \quad (4)$$

where dmi represents the ith time-delay in a sample process and $\text{diag}(z^{-dmi})$ represents the diagonal matrix of dmi. The model described by Equations (3) and (4) can be represented in the time domain as:

$$\begin{bmatrix} y_1(t) \\ \cdot \\ \cdot \\ \cdot \\ y_n(t) \end{bmatrix} = A_m \begin{bmatrix} y_1(t-1) \\ \cdot \\ \cdot \\ \cdot \\ y_n(t-1) \end{bmatrix} + B_m \begin{bmatrix} u_1(t-d_{m1}) \\ \cdot \\ \cdot \\ \cdot \\ u_n(t-d_{mn}) \end{bmatrix}$$

The artificial delay $D_u$ provided for setpoint tracking can be given as:

$$D_u = \text{diag}(z^{-(dmax-dmi)})$$

where dmax=max($d_{mi}$) is the maximum time-delay of all the control variables, and $d_{mi}$ is the time-delay of the ith control variable.

FIG. 3 illustrates a functional block diagram of a controller according to one embodiment of the present invention. The model illustrated in FIG. 3 can be used to implement both the setpoint tracking controller $C_r(z)$ 200 and the disturbance rejecting controller $C_m(z)$ 270.

Referring to FIG. 3, xi represents an input variable to the controller, and xo represents an output variable of the controller. For the setpoint tracking controller $C_r(Z)$ 200, the input variable xi corresponds to the reference variable r, and the output variable xo corresponds to an output to be adjusted by the artificial delay unifier unit $D_u(z)$ 210. For the disturbance rejecting controller $C_m(z)$ 270, the input variable xi corresponds to the filtered mismatch error between measured output variables and estimated process output variables produced by the process and the internal model, respectively. The output variable xo corresponds to a disturbance rejecting control variable to be added with the output of the artificial delay $D_u(z)$ 210 unit to produce the control variables u.

As shown in FIG. 3, the input xi is processed through a first control block 300 including subtraction of a matrix Λ of tuning parameters from an identity matrix I. The matrix Λ can be given as:

$$\Lambda = \text{diag}(\lambda_i) \quad (5)$$

where $\lambda_i$ is a tuning parameter for a channel i. The control block 300 can be represented in matrix form as:

$$\begin{bmatrix} 1-\lambda_1 & 0 & 0 & 0 & 0 \\ 0 & . & 0 & 0 & 0 \\ 0 & 0 & . & 0 & 0 \\ 0 & 0 & 0 & . & 0 \\ 0 & 0 & 0 & 0 & 1-\lambda_n \end{bmatrix}$$

Outputs of the first control block 300 are processed in a second control block 310.

The second control block 310 can be represented as:

$$Z^{-1} G_m^{+-} B_m^{+}(I - z^{-1} A_m) \quad (6)$$

where $G_m^+$ and $B_m^+$ represent the inverse or the "pseudo" inverse of $G_m$ and $B_m$, respectively. "Pseudo" inverse values are described in a copending U.S. Patent Application (Attorney Docket No. 018028-172) entitled "Method and System for Controlling a Multiple Input/Output Process with Minimum Latency Using a Pseudo Inverse Constant", by X. George He, and filed concurrently herewith, the contents of which are hereby incorporated by reference in their entirety. These "pseudo" inverse values may be simplified as standard inverse values $G_m^{-1}$ and $B_m^{-1}$.

The third control block 320 represents an integration operation. The output xo from the third control block 320 can be represented at steady-state as:

$$x_o = \left[ G_m(z) \Big|_{z=1} \right]^{-1} x_i \quad (7)$$

The fourth control block 330 corresponds to the internal process model $G_m$, the output of which is subtracted from the input variable xi.

From the equations above, the following equation representing the output y(z) of the actual process under the control of the described system can be derived:

$$Y(Z) = z^{-dmax}(zI-\Lambda_r)^{-1}(I-\Lambda_r)r(z) + [I-(GDG^{+1})(zI-\Lambda_m)^{-1}(I-\Lambda_m)F] d(z) \quad (8)$$

where r(z) represents the reference input or setpoint variables, d(z) represents the disturbance, $G_m = G_p$, and $D_m = D_p$.

Employing the separate illustrated controllers $C_r(z)$ 200 and $C_m(z)$ 270 as depicted in FIG. 2 and FIG. 3 for setpoint tracking and disturbance rejection, respectively, permits the function of delay unification to be applied only for setpoint tracking without affecting disturbance rejection. This improves the accuracy of disturbance correction by, for example, reducing latency in the feedback path.

While the controllers $C_r(z)$ 200 and $C_m(z)$ 270 are shown in FIG. 2 as separate components to assist in understanding features of the invention, their functionality can, of course, be incorporated in a single component (along with any other components of FIG. 2 except for the actual process being controlled), as long as the delay unification is performed only for setpoint tracking.

It will be appreciated by those skilled in the art that the present invention can be embodied in other specific forms without departing from the spirit or essential characteristics thereof. The presently disclosed embodiments are therefore considered in all respects to be illustrative and not restricted. For example, while the invention has been described above as applicable to a sheetmaking machine, the invention may also be applicable to other types of machines. The scope of the invention is indicated by the appended claims rather than the foregoing description and all changes that come within the meaning and range and equivalence thereof are intended to be embraced therein.

What is claimed is:

1. A control system for a process, comprising:

a first controller for receiving at least a first input variable and a second input variable and producing at least a first control variable and a second control variable, wherein said first controller introduces a first delay to one of the first and second control variables, the first delay being determined as a function of a second delay associated with another of the first and second control variables, and outputting first and second control variables with unified delay;

a processor for modelling effects of the process on the first and second control variables, said processor receiving the delayed first and second control variables output by said first controller, and producing estimated process output variables; and a second controller for processing a difference between measured process output variables and the estimated process output variables to correct for disturbances, wherein the processed difference is added to the delayed first and second control variables output by said first controller, and the sum is received by said processor and the process being controlled.

2. The control system of claim 1, further comprising a filter means for filtering out particular frequencies of the difference between the measured process variables and the estimated process variables fed into said second controller.

3. The control system of claim 1, wherein said second controller corrects for disturbances introduced in the process being controlled.

4. The control system of claim 1, wherein the process is a sheetmaking process.

5. A method controlling a process, comprising the steps of:

receiving at least a first input variable and a second input variable;

producing at least a first control variable and a second control variable;

determining a first delay as a function of a second delay associated with one of the first and second control variables;

introducing the first delay to another of the first and second control variables to produce first and second control variables with unified delay;

measuring process output variables of the process;

modelling effects of the process on the first and second control variables in which the first delay has been introduced and producing estimated process output variables;

processing a difference between the measured process output variables and the estimated process output variables to correct for disturbances; and adding the processed difference to said first and second control variables in which the first delay has been introduced, wherein said step of modelling is performed on the sum.

6. The method of claim 5, further comprising filtering out particular frequencies of the difference between the measured process output variables and the estimated process output variables before said step of processing.

7. The method of claim 5, wherein said step of processing corrects for disturbances introduced in the process being controlled.

8. The method of claim 5, wherein the process is a sheetmaking process.

9. A control system for a process, comprising:

a first controller for receiving at least a first input variable and a second input variable and producing at least a first control variable and a second control variable, said first controller unifying delay between the first control variable and the second control variable and outputting first and second control variables with unified delay;

a processor for modelling effects of the process on the delayed first and second control variables output by said first controller and producing estimated process output variables; and a second controller for processing a mismatch between the estimated process output variables and measured process output variables to correct for disturbances, wherein the processed mismatch is added to the delayed first and second control variables, and the sum is received by said processor and the process being controlled.

10. The control system of claim 9, further comprising a filter means for filtering out particular frequencies of the mismatch between the estimated process output variables and the measured process output variables fed into said second controller.

11. The control system of claim 9, wherein said second controller corrects for disturbances introduced in the process being controlled.

12. The control system of claim 9, wherein the process is a sheetmaking process.

13. A method for controlling a process, comprising:

receiving at least a first input variable and a second input variable;

producing at least a first control variable and a second control variable;

unifying delay between the first control variable and the second control variable;

measuring process output variables of the process;

modelling effects of the process on the first and second control variables in which the delay has been unified and producing estimated process output variables;

processing a mismatch between the measured process output variables and the estimated process output variables to correct for disturbances; and adding the processed mismatch to said first and second control variables in which the delay has been unified, wherein said step of modelling output is performed on the sum.

14. The method of claim 13, further comprising filtering out particular frequencies of the mismatch between the measured process output variables and the estimated process output variables.

15. The method of claim 13, wherein said step of processing corrects for disturbances in the process being controlled.

16. The method of claim 13, wherein the process is a sheetmaking process.

* * * * *